(12) United States Patent
Castellani et al.

(10) Patent No.: US 6,742,032 B1
(45) Date of Patent: May 25, 2004

(54) METHOD FOR MONITORING AND ENCOURAGING COMMUNITY ACTIVITY IN A NETWORKED ENVIRONMENT

(75) Inventors: Stefania Castellani, Grenoble (FR); Natalie S. Glance, Meylan (FR)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/465,561

(22) Filed: Dec. 17, 1999

(51) Int. Cl.[7] .............................................. G06F 15/173
(52) U.S. Cl. ....................................... 709/224; 709/205
(58) Field of Search .................................. 709/203, 232, 709/102, 204, 227, 219, 224, 205; 707/5, 10, 104; 702/189; 705/27, 26, 1, 10; 711/122

(56) References Cited

U.S. PATENT DOCUMENTS

| | | | |
|---|---|---|---|
| 4,996,642 A | 2/1991 | Hey | 364/419 |
| 5,704,017 A | 12/1997 | Heckerman et al. | 395/61 |
| 5,724,567 A | 3/1998 | Rose et al. | 395/602 |
| 5,799,318 A | 8/1998 | Cardinal et al. | 707/104 |
| 5,918,014 A * | 6/1999 | Robinson | 709/219 |
| 5,924,116 A * | 7/1999 | Aggaral et al. | 711/122 |
| 5,995,998 A * | 11/1999 | Furlani et al. | 709/102 |
| 6,016,475 A * | 1/2000 | Miller et al. | 705/1 |
| 6,041,311 A * | 3/2000 | Chislenko et al. | 705/27 |
| 6,112,186 A * | 8/2000 | Bergh et al. | 705/10 |
| 6,144,964 A * | 11/2000 | Breese et al. | 707/10 |
| 6,266,649 B1 * | 7/2001 | Linden et al. | 705/26 |
| 6,321,179 B1 * | 11/2001 | Glance et al. | 702/189 |
| 6,327,590 B1 * | 12/2001 | Chidlovskii et al. | 707/5 |
| 6,385,619 B1 * | 5/2002 | Eichstaedt et al. | 707/104 |
| 6,389,372 B1 * | 5/2002 | Glance et al. | 702/189 |
| 6,412,012 B1 * | 6/2002 | Bieganski et al. | 709/232 |
| 6,425,012 B1 * | 7/2002 | Trovato et al. | 709/227 |
| 6,438,579 B1 * | 8/2002 | Hosken | 709/203 |
| 6,519,639 B1 * | 2/2003 | Glasser et al. | 709/224 |
| 6,539,375 B2 * | 3/2003 | Kawasaki | 707/5 |

OTHER PUBLICATIONS

Ohta, N. et al., "Regional Community Network System", IEICE Transactions on Communications, Intstitute of Electronics Information and Comm. Eng, Tokyo, JPN, vol. E79–B, No. 7, Jul. 7, 1996, pp. 890–898.

Wilcox, D., "Community Networks", British Telecommunications Engineering, British Telecommunications Engineering, vol. 14, No. Part 4, Jan. 14, 1996, pp. 310–314.

* cited by examiner

Primary Examiner—John Follansbee
Assistant Examiner—Jungwon Chang
(74) Attorney, Agent, or Firm—Jeannette Walder

(57) ABSTRACT

The method of the invention overcomes the problems in a community when the amount of interaction drops off through the use of "community crickets." A community cricket monitors the amount of community activity, establishes criteria for deciding when a community is sleeping and uses that criteria for initiating a recovery mechanism for "re-awakening" the community. A community is "sleeping" if the level of activity falls below some predetermined level or criteria. By monitoring the community's activity, the community cricket can prevent sleeping communities from dying. Various methods to detect and to re-awaken sleeping communities are defined.

5 Claims, 3 Drawing Sheets

METHOD FOR MONITORING AND ENCOURAGING COMMUNITY ACTIVITY IN A NETWORKED ENVIRONMENT

FIELD OF THE INVENTION

This invention relates generally to networked environments in which communities of interest engage and interact, and more particularly to a method of monitoring and encouraging continued engagement and interaction.

BACKGROUND OF THE INVENTION

Networked environments, ranging from the early bulletin board systems (BBS) to the current day Intranets and the Internet, have engendered a number of different media for novel forms of social interaction. These media forms include news groups, chat groups (e.g., Internet Relay Chat or IRC), multi-user domains (MUD) and MUD object oriented (MOO), other kinds of on-line multi-user games, as well as distribution lists and mailing lists. What all of these forms have in common is the potential for breeding communities from collections of people who may initially be complete strangers to each other. The dynamics of community creation and evolution is fascinating and seems to depend less on the medium of communication and the initial common interest that drives its members to contribute than on other factors, such as the size of the community, the "netiquette" the members follow, their tolerance, and perhaps most importantly, the range of interests they share, both on-line and off-line.

A relatively new medium for community formation and community support is the recommender system in which users share recommendations around common items of interest. Automatic recommender systems provide personalized recommendations for each user by filtering the recommendations in a way that takes into account each user's revealed preferences. Glance, N., Arregui, D. and Dardenne, M. "Knowledge Pump: Supporting the Flow and Use of Knowledge," Information Technology for Knowledge Management. Eds. U. Borghoff and R. Pareschi, New York: Springer-Verlag, pp. 35–45, 1998 and Glance, N., Arregui, D. and Dardenne, M. "Making Recommender Systems Work for Organizations," Proceedings of PAAM'99, London, UK, Apr. 19–21, 1999, focus on the particular role recommender systems can play in supporting communities of professionals in the workplace.

In the commercial sector, on-line merchants have created groups of customers who share common interests in the goods and services offered by the on-line merchant. Some merchants include recommender systems to provide suggestions to their customers. While such customers may not interact with each other directly, such groups of customers interact with the merchant in similar ways and can be considered a community.

A problem with on-line communities is maintaining the level of interaction over the community's life cycle. The life cycle of a community can be characterized by many different properties. For example, independent of the medium of communication and its initial purpose (play, work, shop, domain of interest), the communities that form can exhibit anything from strong, enduring relationships to weak, ephemeral ones. Communities can have low or high turnover, a long or short life span.

In an on-line community, member presence mandates active participation and almost precludes passive participation (unlike co-located communities where only hermits escape some amount of interaction). Lurkers, or people who visit a community location without participating, observe but are not considered present in the community (and thus not a member). In the life cycle of an on-line community, it is likely that there will be fluctuations in the overall amount of interaction taking place in the community as well as across different individuals. At some time in the life cycle of the community, the activity level or amount of interaction within the community may drop to a very low level (or even zero). In such cases, the community may be only sleeping or it may be dying.

In commercial applications, the life cycle of an on-line merchant's community, such as travel agencies, airline mileage programs, stock traders and other general retail merchants, can similarly vary. Such merchants need ways of reinvigorating their communities of customers or else they will go out of business (their community will eventually die).

SUMMARY OF THE INVENTION

There are two main reasons why the amount of interaction within a community may drop causing the community to sleep or eventually to die. The first reason is that the community does not correspond to a real community anymore. In some communities, it may happen that the center of interest is no longer pertinent and no other common interests remain to bind the group together. The community has been created as a result of an emerging interest, but without a consolidated basis, then after a short period the community members redirect their interest elsewhere. In other communities, it may happen that all information of interest has been shared, at least for the time being.

The second reason is that the community is "sleeping," that is the community still retains a strong center of interest, but something has caused the community activity to decrease demonstrably. Sleeping can occur for different reasons. For example, a set of circumstances may have triggered a chain reaction causing the community members to collectively become lazy. Perhaps the members' interest has decreased in the original center of interest, but the members still retain other common interests. Or, due to randomly coincident reasons, most members are mostly inactive at the same time.

Assume for example, the community is only sleeping. Perhaps some members of the community have, for random reasons, not been active for a while. Then, other members of the community start feeling that the community is not very active anymore and are discouraged from actively participating in it. In addition, some of the members may feel that their credibility is at risk if they submit to a community that nobody seems to be interested in anymore. These reactions may then spread back to the initial set of randomly inactive members. A pernicious negative feedback loop is thus set in place, potentially for ill-founded reasons, with the end result being a sleeping community.

If a community has no center of interest to bind the group together, then it is likely that no recovery mechanism can reawaken the community. In the worst case the community may die. It can also die if it is left to sleep too long. If the community is only sleeping, it will awaken when a new topic of interest occurs. If no action is taken (e.g., no new topic or event occurs to stimulate the community) when a community is sleeping, the community may eventually die.

The method of the invention overcomes the problems in a community when the amount of interaction drops off through the use of "community crickets." A community cricket monitors the amount of community activity, establishes criteria for deciding when a community is sleeping and uses that criteria for initiating a recovery mechanism for "re-awakening" the community. A community is "sleeping" if the level of activity falls below some predetermined level or criteria. An activity coefficient that represents a measure of the community's activity level is defined for each community. When the activity coefficient reaches or falls below a critical activity threshold (established by a community administrator or derived from a model of the dynamics of the community), the community cricket initiates a recovery mechanism. Alternatively, the community cricket can monitor the time period that community activity is below the critical threshold. If activity stays below the critical level for a predetermined period of time, the community cricket then initiates a recovery mechanism. By monitoring the community's activity and initiating appropriate activity, the community cricket can prevent sleeping communities from dying.

Generally, the community cricket is active only when the community activity falls below a critical threshold. When a community cricket initiates activity, such as by providing a recommendation, such a recommendation will generally not be as high quality as recommendations coming from a human member of the community. When the community is active, then only recommendations from human members of the community will be received. In one embodiment of the invention, the cricket remains quiet unless it deems that the community is sleeping, at which point it awakens and instantiates the recovery mechanism. In an alternative embodiment, the community cricket tunes its level of activity to the amount of activity it observes in the community. It may have a bi-phasal mode of activity (on-off, as before, or low/high), or a continuous set of modes (inversely proportional to observed amount of activity).

DETAILED DESCRIPTION OF THE PREFERRED EMBODIMENTS

Figure 1:
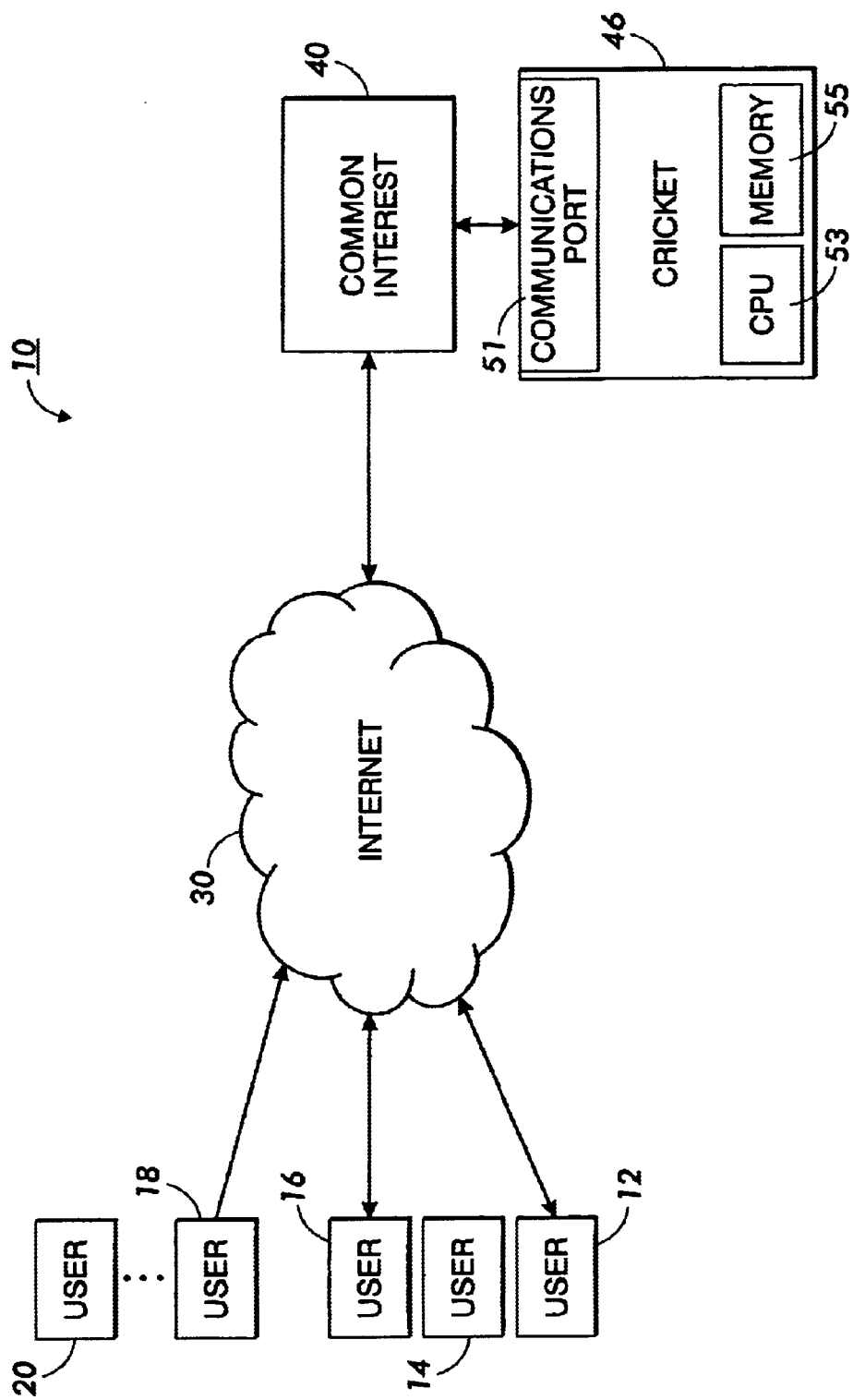
FIG. 1 is a block diagram of an on-line community interacting over the Internet with a community cricket according to the invention monitoring the community's activity.

Referring now to the drawings, and especially to FIG. 1, a community is generally shown therein and identified by reference numeral 10. Community 10 presently includes users 12, 16 and 18. Users 14 and 20 do not participate in community 10 at this time, but could join at a later date. Users 12, 16 and 18 communicate via the Internet 30 with common interest 40, which may be a news group or a distribution list, an on-line merchant or a recommender system. From time to time, each member user participates in the community, for example, by sending a communication to the common interest 40 or by downloading recently posted messages or other member information from common interest 40. Community cricket 46 monitors the level of activity or interaction among the users and common interest 40. When community cricket 46 determines that the community is sleeping, for example by detecting a level of activity below a predetermined level, community cricket 46 takes action to re-awaken the community. For example, in the case of a news group, cricket 46 may post a new message to be read by the users.

Community cricket 46 can be embodied as a software program running on common interest 40 or at a different location. Alternatively, community cricket 46 can be embodied in hardware including a central processing unit 53, memory 55 for storing critical values and other data monitored and a communications port 51 for enabling communication with common interest 40. In FIG. 1, cricket 46 is shown communicating directly with common interest 40, but cricket 46 could also communicate remotely through the Internet 30 or some other means of communication.

The invention is described in more particularity with respect to two general cases. The first case is a news group and associated distribution lists. The second case is the type of recommender system in which members contribute recommendations of new items as well as recommendations for existing items, exemplified by the Knowledge Pump (as described above). Many other recommender systems operate on a fixed data store of items to recommend as opposed to a data store of items contributed by users, to which the community cricket could also be applied. The community cricket could be used in different situations, e.g. commercial applications, such as mileage programs, mailings, stock trading, sales activity in the retail market.

Generally, the community cricket is active only when the community activity falls below a critical threshold. When a community cricket initiates activity, such as by providing a recommendation, such a recommendation will generally not be as high quality as recommendations coming from a human member of the community. When the community is active, then only recommendations from human members of the community will be received. In one embodiment of the invention, the cricket remains quiet unless it deems that the community is sleeping, at which point it awakens and instantiates the recovery mechanism. In an alternative embodiment, the community cricket tunes its level of activity to the amount of activity it observes in the community. It may have a bi-phasal mode of activity (on-off, as before, or low/high), or a continuous set of modes (inversely proportional to observed amount of activity). In the two general cases described below, the cricket remains inactive until it determines the community is sleeping.

MONITORING COMMUNITY ACTIVITY

For each kind of community 10, we define an activity coefficient (CAC) that represents a measure of the community's activity level. For example, in the context of a news group the CAC is a function of the number of accesses per unit time per user, the number of threads per unit time per user, the length of the threads, as well as potentially other data. In a recommender system, the CAC is a function of the number of submissions, reviews and visits per user per unit time.

Over any given time period, the CAC will fluctuate, representing the fluctuations of activity in the community. The community cricket 46 monitors the CAC and is programmed to react when the CAC consistently falls below a certain critical threshold, $CAC_{crit}$, for a given time interval $T_s$. Initially, when the cricket 46 begins monitoring, the community is assumed to be awake until proven otherwise. The critical activity threshold, $CAC_{crit}$, that triggers the community cricket 46 to awaken the community can be determined in a number of ways. One possibility is that this activity threshold is a parameter of the cricket 46 that is set by an administrator of the common interest 40. Setting the value by an administrator may not be effective in all cases, but may be the only way to set an initial value for a new community. Alternatively, the threshold $CAC_{crit}$ could be derived from a model of the dynamics of the community activity.

Specifically, one can expect that the activity threshold $CAC_{crit}$ depends on a number of properties of the community, such as the number of members in the community, the age of the community, the historic average activity levels, the historic maximum and minimum observed activity levels, turnover in the community, as well as potentially other data. In general, it can be expected that the community activity will tend to fluctuate in fairly generic ways, ranging from fairly constant levels, to cyclical behavior. Although a model of community activity would predict the size of these fluctuations as a function of the community's properties, such calculations may prove cumbersome or require a sufficient period of time to acquire. Within the context of such a model, we propose a somewhat more sophisticated criteria for triggering the community cricket 46, which is a specific case of the general threshold criteria $CAC_{crit}$.

We define an alternative criteria for a sleeping community 10 as one in which the community activity coefficient CAC fluctuates about some low level of activity, $CAC_{min}$, with a magnitude of fluctuation smaller than some delta $\Delta$, for a period of time that exceeds $T_s$. This criteria reduces to the generic criteria: the activity threshold $CAC_{crit}=CAC_{min}+\Delta$ is now a function of community properties (instead of being determined by administrative fiat). Similarly, other refinements of the community activity state (asleep or awake) are likely to be subsumed by the general criteria.

Figure 2:
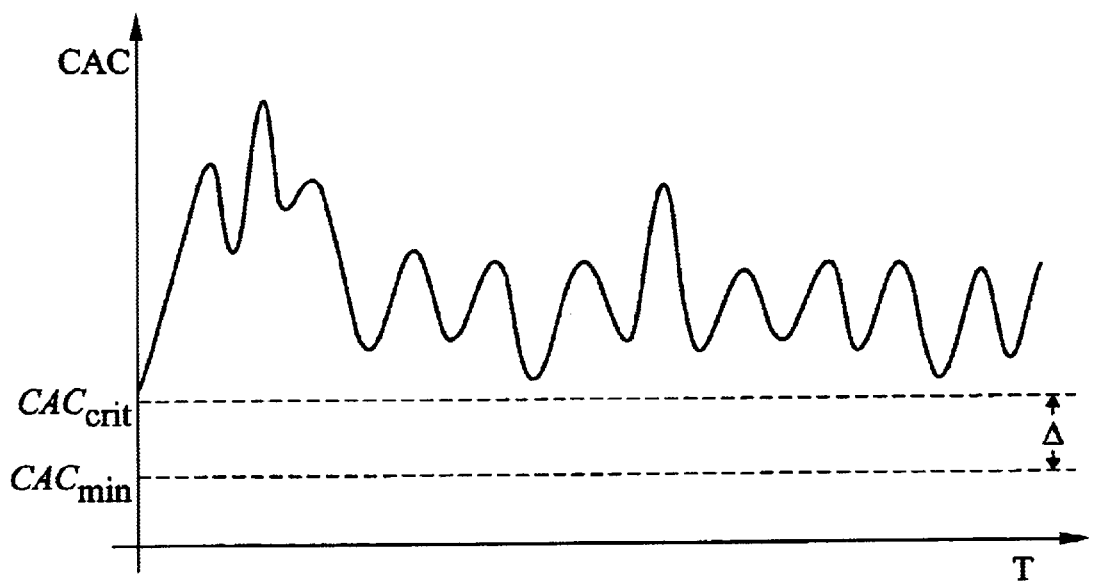
FIG. 2 is a graph of community activity over time in which the community activity coefficient does not fluctuate below the threshold.

An example of how the activity level may vary for a community over time and the corresponding state of the cricket is shown in FIG. 2. In FIG. 2, the CAC fluctuates above $CAC_{min}$ and above $CAC_{crit}$ for all time periods shown. Since community activity stays above $CAC_{crit}$ for all times, the community is deemed active and the cricket 46 sleeps (does not do anything to affect community activity).

Figure 3:
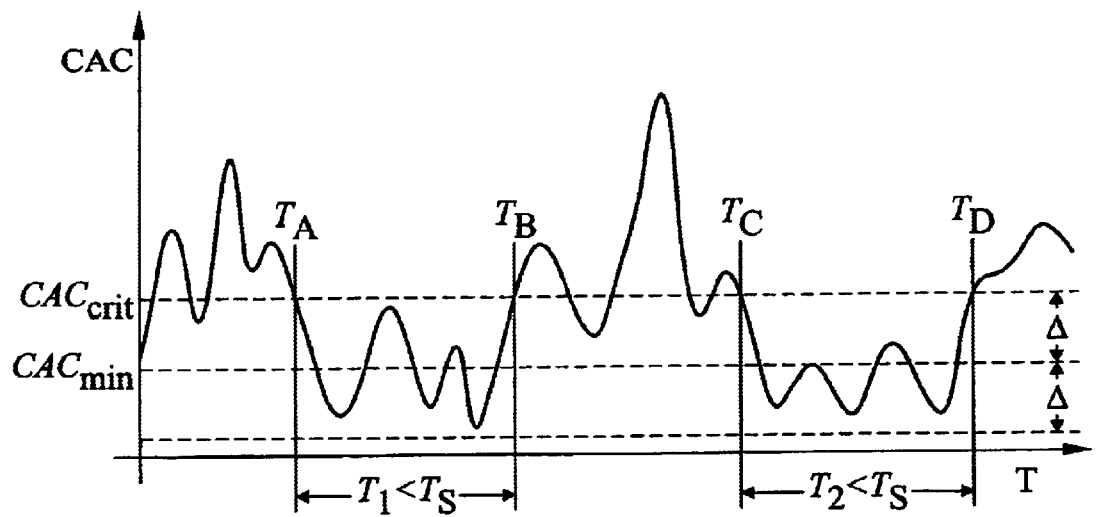
FIG. 3 is a graph of community activity over time in which the community activity coefficient fluctuates below the critical threshold for two time periods.

In the graph of FIG. 3, the community 10 can be seen to be still active, but getting sleepy. In this example, the criteria for sleeping is defined to be when the community's activity fluctuates about the minimum activity coefficient, with a magnitude of fluctuation smaller than some delta $\Delta$, for a predetermined period of time, $T_S$. Each time the community activity drops below $CAC_{crit}$, q the community is beginning to get sleepy. Up until time $T_A$, all activity is above $CAC_{min}$, with only two drops below $CAC_{crit}$. From $T_A$ to $T_B$, activity drops below $CAC_{crit}$ and fluctuates below $CAC_{min}$ most of the time. Since $T_f=T_B-T_A <T_S$, the cricket 46 takes no action. From time $T_B$ to time $T_C$, community activity increases is now mostly above $CAC_{crit}$. Activity drops off again at time $T_C$, where it again fluctuates below $CAC_{min}$. At time $T_D$ community activity has increased and is above $CAC_{crit}$.

Each time the community activity falls below $CAC_{crit}$, the cricket 46 could be programmed to initiate some activity to awaken the community. However, in a preferred embodiment, if the CAC drops below $CAC_{crit}$ for time intervals longer than $T_s$ or fluctuates about the $CAC_{min}$, with a magnitude of fluctuation smaller than some delta $\Delta$, for a predetermined period of time $T_S$, as shown in FIG. 3, then the cricket 46 observes, but bides its time.

Figure 4:
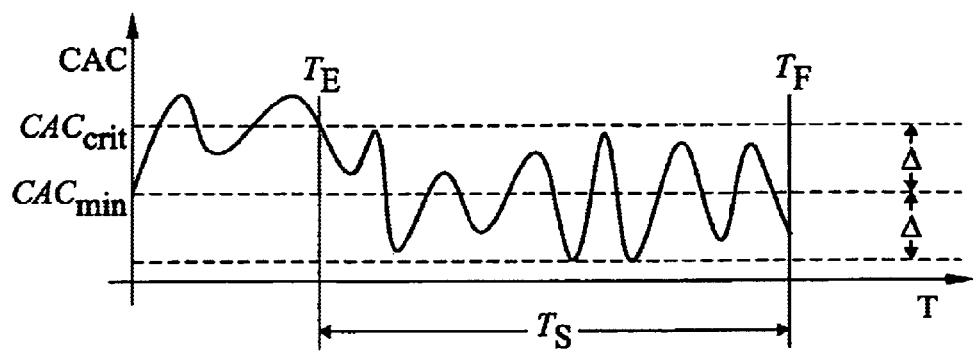
FIG. 4 is a graph of community activity over time in which the community activity coefficient fluctuates below the critical threshold for a continuous period of time.
Figure 5:
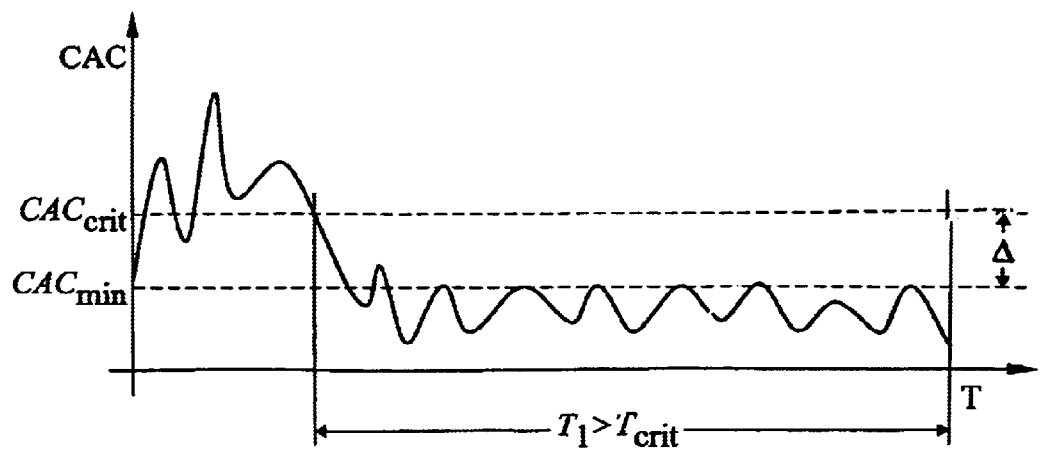
FIG. 5 is a graph of community activity over time in which the community continues to sleep even after cricket intervention.

In FIG. 4, community activity is above $CAC_{crit}$ or $CAC_{min}$ until time $T_E$. From $T_E$ to $T_F$, activity is below $CAC_{crit}$ and frequently below $CAC_{min}$. If the CAC consistently fluctuates about $CAC_{min}$ with a magnitude fluctuation less than $\Delta$ so that CAC is less than $CAC_{crit}$ for a time interval larger than $T_S$, then cricket 46 jumps into action. Cricket 46 will try to reawaken the community 10 and will continue to do so until either the community is considered to have been reactivated (CAC is greater than $CAC_{crit}$ for a time period greater than $T_a$), in which case the cricket 46 goes back to sleep or the community continues to sleep despite the cricket's intervention past a critical time period $T_{crit}$ and falls into a coma. If the community still sleeps even after cricket intervention as shown in FIG. 5, then the cricket 46 can send a message to the community administrator (e.g., software agents such as user profilers, community managers, and system administrator assistants) suggesting that the community be closed.

RE-AWAKENING THE COMMUNITY

Once the cricket 46 determines the community is sleeping (using whatever criteria that has been defined for the particular community), the cricket automatically takes action to wake it back up. However, members of the community or the community manager/administrator could also request the cricket to activate even when the community is not sleeping. In its active mode, the cricket jumps into the community, acting as a special member who searches for new information that could be of interest for the community members. The intention is that the cricket's burst of activity (which is not included in the calculation of the CAC) will encourage real members of the community to restart their own activities. In the case of a newsgroup, member activity may include posting and replying, while in a recommender system such as the Knowledge Pump may include submitting, reviewing and visiting other people's recommendations.

A community cricket's activity may consist of whatever is relevant to the particular community. In a news group, the cricket may be limited to posting new material (as opposed to replying to threads). In a recommender system, the cricket may recommend new items (as opposed to reviewing existing ones). An on-line merchant may start a special sale and notify all of its customers. The community cricket selects information to submit based on the particular community. In order to find and filter material, the cricket first consults a community profiler agent for the community. The community profiler agent can be as simple as an agent which points to a community profile consisting of weighted keywords. More sophisticated community profiles will maintain the timeliness of the community profile by adaptively learning the community's interests as they evolve over time, for example by analyzing the content of text submitted to the community, ratings of said text, if such exist, and frequency of access to said text. In any case, what the cricket receives from the community profiler at its time of awakening is a list of weighted keywords, which is called the community interest profile (CIP). If a community profiler agent as such does not exist, the cricket will itself encapsulate this function.

A cricket will then act as a broker, using the CIP as a sort of business card to represent the community. Using the CIPs, the cricket can then:

1. search over repositories for information relevant to the community with a query constructed on the basis of the community keywords and their relative weights;

2. calculate the correlations between its community and others by applying a similarity function over the respective communities' CIPs;

3. search for information of interest that has been submitted inside highly correlated communities; and 4. find new candidates for joining the community from highly correlated communities.

In recommender systems, the community cricket can be personalized to the user in the fashion of filterbots. Once the user rates a sufficient number of items that have been contributed by the community cricket, the correlation between each user and the community cricket can be determined. Using this correlation, the cricket's submissions can be filtered and prioritized in the same way the recommender system filters and prioritizes any other user's submissions. If a community is endowed with a number of community crickets, each of these may then evolve to specialize for self-selected subgroups of the community.

If the community fails to re-start and falls into a coma, the cricket can then send a message suggesting that the community be closed. If this happens, user profiler agents can then attempt to re-direct users to other appropriate and more active communities, with the help of the community crickets' record of community activity.

Finally, more sophisticated crickets would analyze the history of community activity in order to detect danger points, e.g., recurrent sleeping periods, each shorter than $T_s$, or a downward trend. Thus, the cricket might react not only when the community is already sleeping, but also when it feels the community is in danger of sleeping.

Communities which share information cut across functional and geographic boundaries. A key advantage of extending information sharing using information technologies is that the breadth and extent of the social network can be greatly increased. However, it is not enough to simply introduce new media for communication in order to create and/or sustain communities. Information technologies supporting information sharing must consider the entire life cycle of communities. However, current technologies have concentrated principally on providing the means for communication across distances.

While the dynamics of the communication have been considered in the sociological sense and have led both to spontaneous and prescriptive forms of governance for on-line communities, the use of community crickets (automatic or semi-automatic agents) for the sustenance of communities provides a means of extending knowledge sharing for communities by innovating in the area of agent support for the community life cycle.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for monitoring and encouraging activity in a community of users having a common interest in a networked environment, the community of users engaging and interacting with one another pertaining to the common interest, comprising:

establishing a critical activity coefficient for deciding when the community is sleeping, wherein the community is sleeping if a measured rate at which the community of users engage and interact with one another in the community falls below the critical activity coefficient;

monitoring the rate at which the community of users engage and interact with one another in the community;

determining when the monitored activity is less than the established critical activity coefficient for sleeping;

responsive to a determination that the community is sleeping, initiating a recovery mechanism for increasing activity in the community and reawakening the community; and wherein the community comprises a news group and the critical activity coefficient is a fraction of number of accesses per unit time per user, number of threads per time per user and length of the threads.

2. The method of claim 1, wherein the determining step comprises determining when the community's activity falls below the critical activity coefficient for a predetermined period of time.

3. The method of claim 1, further comprising the step of notifying a community administrator if the community continues to sleep after initiation of the recovery mechanism.

4. A method for monitoring and encouraging activity in a community of users having a common interest in a networked environment, the community of users engaging and interacting with one another pertaining to the common interest, comprising:

establishing a critical activity coefficient for deciding when the community is sleeping, wherein the community is sleeping if a measured rate at which the community of users engage and interact with one another in the community falls below the critical activity coefficient;

monitoring the rate at which the community of users engage and interact with one another in the community;

determining when the monitored activity is less than the established critical activity coefficient for sleeping;

responsive to a determination that the community is sleeping, initiating a recovery mechanism for increasing activity in the community and reawakening the community; and wherein the community comprises a recommender system and the critical activity coefficient is a function of the number of submissions, reviews and visits per user per unit time.

5. A method for monitoring and encouraging activity in a community of users having a common interest in a networked environment, the community of users engaging and interacting with one another pertaining to the common interest, comprising:

establishing a criteria for deciding when the community is sleeping, wherein the community is sleeping if a measured rate at which the community of users engage and interact with one another in the community falls below the established criteria;

monitoring the rate at which the community of users engage and interact with one another in the community;

determining when the monitored activity is less than the established criteria for sleeping;

responsive to a determination that the community is sleeping, initiating a recovery mechanism for increasing activity in the community and reawakening the community;

providing a community profile agent for the community and wherein the community profile includes a plurality of weighted keywords and wherein the recovery mechanism comprises:

searching over repositories for information relevant to the community with a query constructed on the basis of the community keywords and their relative weights;

calculating correlations between the community and others by applying a similarity function over the respective communities' profiles;

searching for information of interest that has been submitted inside highly correlated communities; and finding new candidates for joining the community from highly correlated communities.

\* \* \* \* \*